United States Patent
Chou

(10) Patent No.: US 11,621,658 B2
(45) Date of Patent: Apr. 4, 2023

(54) CONTROL CIRCUIT APPLIED TO LIFTING PLATFORM AND METHOD OF CONTROLLING THE SAME

(71) Applicant: Hua-Chen Chou, Taoyuan (TW)

(72) Inventor: Hua-Chen Chou, Taoyuan (TW)

(*) Notice: Subject to any disclaimer, the term of this patent is extended or adjusted under 35 U.S.C. 154(b) by 0 days.

(21) Appl. No.: 17/468,661

(22) Filed: Sep. 7, 2021

(65) Prior Publication Data

US 2023/0006577 A1 Jan. 5, 2023

(30) Foreign Application Priority Data

Jul. 1, 2021 (TW) .................................. 110124269

(51) Int. Cl.
*G05F 1/00* (2006.01)
*H02P 7/292* (2016.01)
*H02P 7/29* (2016.01)
*A47B 9/00* (2006.01)

(52) U.S. Cl.
CPC ............... *H02P 7/292* (2013.01); *A47B 9/00* (2013.01); *H02P 7/29* (2013.01); *A47B 2200/0056* (2013.01); *A47B 2200/0061* (2013.01)

(58) Field of Classification Search
CPC . H02P 7/292; H02P 7/29; H02P 27/06; A47B 9/00
See application file for complete search history.

(56) References Cited

U.S. PATENT DOCUMENTS

| 10,211,737 B1* | 2/2019 | Costa .................. H02M 1/4225 |
| 2012/0181968 A1 | 7/2012 | Clausen et al. |
| 2021/0159811 A1 | 5/2021 | Lange et al. |

FOREIGN PATENT DOCUMENTS

CN  212148433 U  * 12/2020

* cited by examiner

*Primary Examiner* — Karen Masih
(74) *Attorney, Agent, or Firm* — Chun-Ming Shih; HDLS IPR Services

(57) ABSTRACT

A control circuit applied to a lifting platform controls a motor to adjust the height of a platform. The control circuit includes an AC/DC conversion circuit, a DC/DC conversion circuit, a detection unit, and a control unit. The detection unit detects an output end of the AC/DC conversion circuit and provides a detection signal. The control unit provides a PWM signal according to the detection signal to control the DC/DC conversion circuit so that the DC/DC conversion circuit converts a DC voltage to an output voltage. When the control unit realizes that the DC voltage or a DC power provided by the AC/DC conversion circuit is less than a power supply threshold according to the detection signal, the control unit decreases a duty cycle of the PWM signal to maintain the DC voltage or the DC power to be greater than or equal to the power supply threshold.

15 Claims, 5 Drawing Sheets

CONTROL CIRCUIT APPLIED TO LIFTING PLATFORM AND METHOD OF CONTROLLING THE SAME

BACKGROUND

Technical Field

The present disclosure relates to a control circuit applied to a lifting platform and a method of controlling the same, and more particularly to a control circuit for maintaining the maximum output power and a method of controlling the same.

Description of Related Art

The statements in this section merely provide background information related to the present disclosure and do not necessarily constitute prior art.

Modern people need a new tool to improve the poor circulation caused by sedentary sitting. Therefore, in order to meet personal working comfort and ergonomic design, the application of adjustable table height is becoming more and more popular. In the application of lifting tables, manual, pneumatic, or electric methods are usually used to adjust the height of the table body of the lifting table. In particular, since the control manner of adjusting the height of the table body in an electric manner is more precise and the adjustment effect is better, the application range of the electric lifting table is wider.

However, when the load of the traditional electric lifting table increases, if the maximum output power of the converter is exceeded, the output power of the converter will always decrease, resulting in poor load capacity. Also, when the load is heavy (i.e., the lifting table operates in a heavy load condition), the electric lifting table cannot rise. Therefore, the solution of the prior art is usually to replace a converter with a larger output power to increase the output power of the converter, thereby being able to drive a heavier load. However, this solution will increase the cost of the electric lift table, and the circuit is bulky.

SUMMARY

In order to solve the above-mentioned problems, the present disclosure provides a control circuit applied to a lifting platform controls a motor to adjust the height of a platform. The control circuit includes a conversion circuit, a detection unit, and a control unit.

The conversion circuit receives an input voltage and provides an output voltage to control the motor. The conversion circuit includes an AC/DC conversion circuit and a DC/DC conversion circuit. The AC/DC conversion circuit converts the input voltage into a DC voltage. The DC/DC conversion circuit converts the DC voltage into the output voltage. The detection unit detects an output end of the AC/DC conversion circuit and provides a detection signal. The control unit provides a PWM signal according to the detection signal to control the DC/DC conversion circuit so that the DC/DC conversion circuit converts the DC voltage into the output voltage. The control unit sets a power supply threshold. When the control unit realizes that the DC voltage or a DC power provided by the AC/DC conversion circuit is less than the power supply threshold according to the detection signal, the control unit decreases a duty cycle of the PWM signal to decrease a rotation speed of the motor, and maintains the DC voltage or the DC power is greater than or equal to the power supply threshold.

In order to solve the above-mentioned problems, the present disclosure provides a method of controlling a lifting platform. The method includes steps of: setting a power supply threshold, and controlling a DC/DC conversion circuit to convert a DC voltage provided by an AC/DC conversion circuit into an output voltage to control a motor; detecting an output end of the AC/DC conversion circuit to provide a detection signal, and adjusting a PWM signal of controlling the DC/DC conversion circuit according to the detection signal; decreasing a duty cycle of the PWM signal to decrease a rotation speed of the motor when the DC voltage or a DC power provided by the AC/DC conversion circuit is less than the power supply threshold according to the detection signal, and maintaining the DC voltage or the DC power to be greater than or equal to the power supply threshold.

The main purpose and effect of the present disclosure is to use the control unit to detect the maximum output power of the AC/DC conversion circuit to maintain the load capacity of the conversion circuit, and to solve the poor load capacity and the platform cannot be raised of the prior art. Therefore, when the lifting platform operates in the heavy load condition, the speed of the lifting table can still be controlled faster than the speed of the lifting table in the prior art.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
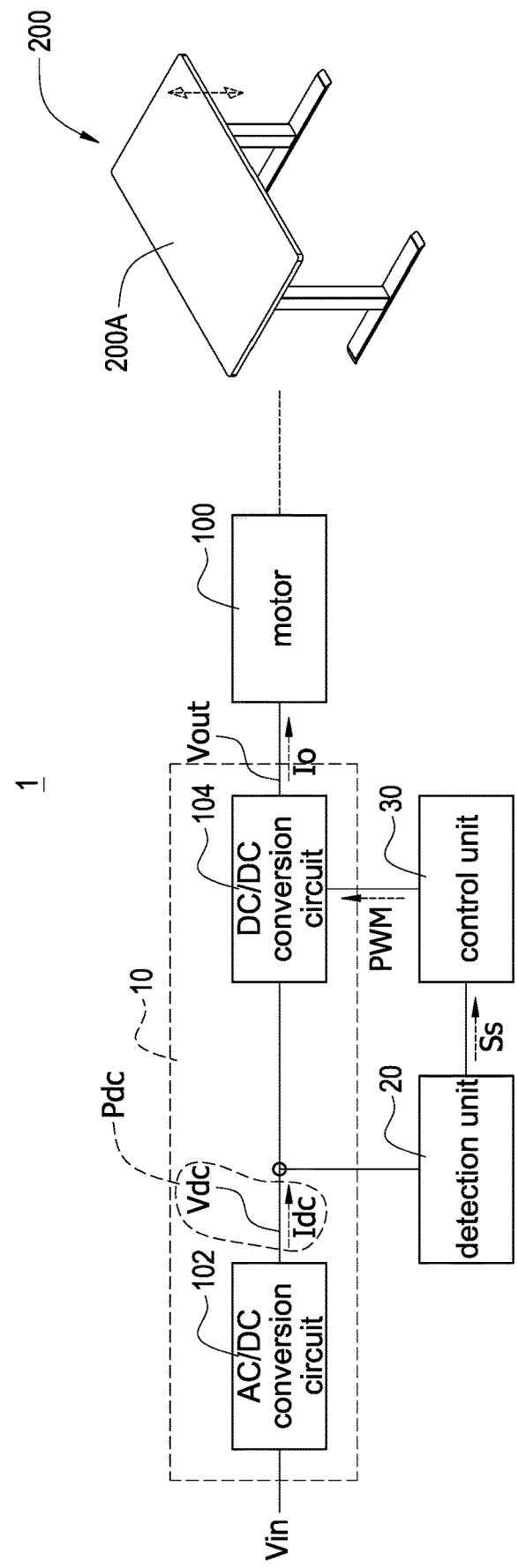
FIG. 1 is a block circuit diagram of a control circuit applied to a lifting platform according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a control circuit applied to a lifting platform according to the present disclosure. The control circuit 1 controls a motor 100 to adjust the height of a platform 200A. The platform 200A may be a desk body (for example but not limited to an office desk, a tea table, etc., which are not used to carry heavy machine tools or large construction materials), and therefore the lifting platform 200 is a lifting table. The control circuit 1 includes a conversion circuit 10, a detection unit 20, and a control unit 30. In some embodiments, the conversion circuit 10 may be an isolated or non-isolated DC converter. The conversion circuit 10 includes an AC/DC conversion circuit 102 of receiving an AC input Vin and a DC/DC conversion circuit 104 of receiving a DC voltage Vdc. The motor 100 may be a DC voltage Vdc motor, which is characterized by easy speed adjustment, smooth speed adjustment, and large overload capacity. It is especially suitable for electric desk structures used for personal office or reading.

Refer to FIG. 1 again, the AC/DC conversion circuit 102 receives the input voltage Vin, converts the input voltage Vin into the DC voltage Vdc, and provides the DC voltage Vdc to the DC/DC conversion circuit 104. The DC/DC conversion circuit 104 receives the DC voltage Vdc, converts the DC voltage Vdc into the output voltage Vout, and provides the output voltage Vout to control the motor 100. The detection unit 20 is coupled to an output end of the AC/DC conversion circuit 102, and provides a detection signal Ss according to the detection results. The control unit 30 is coupled to a power switch (not shown) of the DC/DC conversion circuit 104 and the detection unit 20, and provides a pulse width modulation (PWM) signal PWM to control switching of the power switch according to the detection signal Ss so that the DC/DC conversion circuit 104 converts the DC voltage Vdc into the output voltage Vout by switching the power switch. During the operation of the DC/DC conversion circuit 104, the control unit 30 adjusts the output voltage Vout by adjusting the duty cycle of the PWM signal PWM according to the detection signal Ss at any time so as to adjust the rotation speed of the motor 100 by adjusting the output voltage Vout (the output voltage Vout corresponds to the rotation speed of the motor 100).

Figure 2:
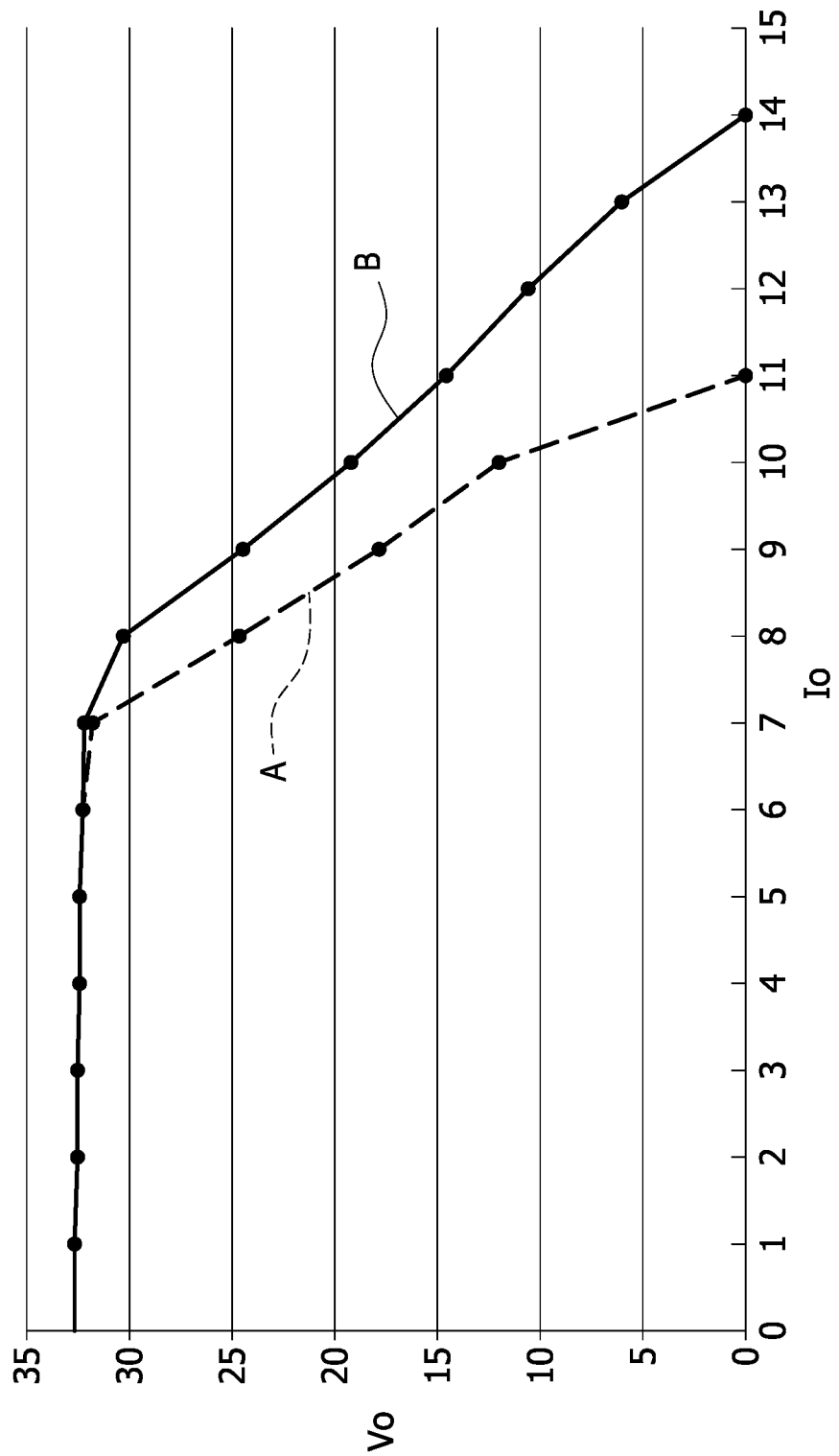
FIG. 2 is a diagram of a power load curve of a converter according to the present disclosure.

Please refer to FIG. 2, which shows a diagram of a power load curve of a converter according to the present disclosure, and also refer to FIG. 1 and Table 1 below. The curve A in FIG. 2 is drawn from Table 1 below: the curve of the DC power Pdc is drawn by points of the input voltage Vin (100V/50 Hz). The curve B is drawn from Table 1 below: the curve of the DC power Pdc is drawn by points of the input voltage Vin (240V/50 Hz). In FIG. 2, only the parameters of two different types of conversion circuits 10 are shown as examples, but not limited to these parameters. Since the control circuit of the lifting platform in the prior art is the heavier the load of the platform 200A, the control unit 30 will continuously increase the output current Io of the DC/DC conversion circuit 104 in order to drive the platform 200A. When the output current Io continuously increases until the DC power Pdc that the AC/DC conversion circuit 102 can provide exceeds the maximum output power, the increase of the output current Io will only cause the DC power Pdc instead of increasing but decreasing. At this condition, the DC current Idc of the AC/DC conversion circuit 102 continuously increases, but the DC voltage Vdc continuously decreases so that the platform 200A cannot rise when the load of the platform 200A is under the heavy load condition due to the low DC voltage Vdc and the poor load capacity.

TABLE 1

(the output voltage and the output current of the conversion circuit)

| DC current Idc | DC voltage Vdc | |
|---|---|---|
| | input voltage Vin(100 V/50 Hz) | input voltage Vin(240 V/50 Hz) |
| 0 | 32.7 | 32.7 |
| 1 | 32.6 | 32.7 |

TABLE 1-continued (the output voltage and the output current of the conversion circuit)

| DC current Idc | DC voltage Vdc | |
|---|---|---|
| | input voltage Vin(100 V/50 Hz) | input voltage Vin(240 V/50 Hz) |
| 2 | 32.6 | 32.6 |
| 3 | 32.5 | 32.6 |
| 4 | 32.4 | 32.4 |
| 5 | 32.4 | 32.4 |
| 6 | 32.3 | 32.3 |
| 7 | 31.9 | 32.2 |
| 8 | 24.7 | 30.3 |
| 9 | 17.8 | 24.5 |
| 10 | 12.1 | 19.2 |
| 11 | 0 | 14.6 |
| 12 | | 10.5 |
| 13 | | 6 |
| 14 | | 0 |

The main purpose and effect of the present disclosure are that: the control unit 30 detects the maximum output power of the AC/DC conversion circuit 102 to maintain the load capability of the conversion circuit 10 and solve the problem of that the platform 200A cannot rise when the load of the platform 200A operates in the heavy load condition. Specifically, the control unit 30 sets power supply threshold of the output end of the AC/DC conversion circuit 102. When the control unit 30 realizes that the DC voltage Vdc or the DC power Pdc is less than the power supply threshold according to the detection signal Ss, the control unit 30 decreases the duty cycle of the PWM signal PWM to decrease the rotation speed of the motor 100, and maintains the DC voltage Vdc or the DC power Pdc to be greater than or equal to the power supply threshold. When the control unit 30 realizes that the DC voltage Vdc or the DC power Pdc is greater than or equal to the power supply threshold according to the detection signal Ss, the control unit 30 increases the duty cycle of the PWM signal PWM to increase the rotation speed of the motor 100, thereby increasing the adjustment speed of lifting the platform 200A.

Please refer to FIG. 1 and FIG. 2 again, the control unit 30 provides two control and setting manners. One of the manners is that the control unit 30 sets the power supply threshold according to the power load curve shown in FIG. 2. Specifically, the power load curve is a DC power Pdc curve formed by the product of the DC voltage Vdc and the DC current Idc. The control unit 30 previously sets the voltage value of the DC voltage Vdc corresponding to the DC power Pdc at the maximum output power point as the power supply threshold (the power supply threshold is the voltage threshold). Afterward, the detection unit 20 detects the DC voltage Vdc and provides a detection signal Ss representing the magnitude of the DC voltage Vdc. The control unit 30 receives the detection signal Ss representing the magnitude of the DC voltage Vdc to realize the magnitude of the DC voltage Vdc. Afterward, the control unit 30 compares the DC voltage Vdc and the voltage threshold to determine whether to limit the duty cycle of the PWM signal PWM.

Specifically, when the DC voltage Vdc is greater than the voltage threshold, the control unit 30 increases the duty cycle of the PWM signal PWM to increase the output current Io of the DC/DC conversion circuit 104, thereby increasing the rotation speed of the motor 100. When the DC voltage Vdc is less than or equal to the voltage threshold, the control unit 30 decreases the duty cycle of the PWM signal PWM to decrease the output current Io of the DC/DC conversion circuit 104, thereby decreasing the rotation speed of the motor 100. Since the output current Io is decreased, the DC voltage Vdc will no longer continuously decrease so as to maintain the DC power Pdc of the AC/DC conversion circuit 102 at the maximum output power. At this condition, although the speed of lifting the platform 200A slows down, the phenomenon that the platform 200A cannot be risen like the conventional technology does not occur. Therefore, compared with the prior art, the lifting table of the present disclosure can increase the lifting speed of the platform 200A under the heavy load condition.

The other manner is that the detection unit 20 detects the DC voltage Vdc and the DC current Idc to provide the detection signal Ss representing the DC voltage Vdc and the DC current Idc. The control unit 30 receives the detection signal Ss representing the magnitude of the DC voltage Vdc and the DC current Idc to acquire the magnitude of the DC voltage Vdc and the DC current Idc. Afterward, the control unit 30 calculates the DC power Pdc according to the DC voltage Vdc and the DC current Idc, and continuously tracks the increase and decrease of the DC power Pdc when the DC current Idc rises. When the DC current Idc rises but the DC power Pdc decreases, the control unit 30 sets the previous DC power Pdc as the maximum output power, and sets this DC power Pdc as a power threshold (i.e., the power supply threshold is a power threshold). Afterward, the control unit 30 compares the current DC power Pdc with the power threshold to correspondingly adjust the duty cycle of the PWM signal PWM.

When the DC power Pdc is greater than the power threshold, the control unit 30 increases the duty cycle of the PWM signal PWM to increase the output current Io of the DC/DC conversion circuit 104, thereby increasing the rotation speed of the motor 100. When the DC power Pdc is less than the power threshold, the control unit 30 decreases the duty cycle of the PWM signal PWM to decrease the output current Io of the DC/DC conversion circuit 104, thereby decreasing the rotation speed of the motor 100. Since the output current Io is decreased, the DC voltage Vdc will no longer continuously decrease so as to maintain the DC power Pdc of the AC/DC conversion circuit 102 at the maximum output power. At this condition, although the speed of lifting the platform 200A slows down, the phenomenon that the platform 200A cannot be risen like the conventional technology does not occur. Therefore, compared with the prior art, the lifting table of the present disclosure can increase the lifting speed of the platform 200A under the heavy load condition.

Furthermore, the relationship between the output voltage Vo and the PWM signal PWM may be, for example but not limited to, as shown in Table 2 below. As shown in Table 1 and FIG. 2, when the output current Io is increased to large enough, The DC voltage Vdc is inevitably to drop. The control unit 30 controls the PWM signal PWM to decrease according to the decrease of the DC voltage Vdc so that the output voltage Vo decreases accordingly and the rotation speed of the motor 100 is decreased. As the rotation speed of the motor 100 decreases, the output current Io also decreases, thereby causing the DC voltage Vdc to increase. With this circuit characteristic and the setting of the power supply threshold, the load capacity of the conversion circuit 10 can be maintained, and the situation that the platform 200A cannot rise when the load of the platform 200A is under the heavy load condition can be solved. The main control method is to maintain the DC voltage Vdc outputted by the AC/DC conversion circuit 102 above a specific voltage, and the output voltage Vo changes within a specific interval as the PWM signal PWM is adjusted (for example but not limited to 0 to 33 volts).

TABLE 2

(the output voltage and the PWM signal)

| PWM signal PWM | output voltage Vo |
| --- | --- |
| 100% | 32 V |
| 70% | 32 V* 0.7 |
| 30% | 32 V * 0.3 |
| 10% | 32 V * 0.1 |

Please refer to FIG. 2 again, when the power supply threshold is the power threshold, two manners of operating maximum output parameter may be implemented, mainly for the user to operate the control circuit 1, the control circuit 1 can directly lift the lifting platform 200 with the maximum power, and then the PWM signal PWM is adjusted according to the detection unit 20 to detect the actual operation condition of the conversion circuit 10 so as to save the time of lifting the platform 200A. One of the operation manners is that, before the actual operation of the control circuit 1, the control unit 30 performs pre-loading (gradually increasing the output current Io by internal memory or manual operation) to acquire the corresponding changes in the DC voltage Vdc and the DC current Idc. Afterward, the maximum output power is calculated during the process of its change, that is, parameters corresponding to the DC power Pdc that starts to decrease is memorized (stored). Therefore, in the actual operation of lifting the platform 200A, the DC/DC conversion circuit 104 is directly controlled according to the memorized maximum output parameter, and the duty cycle of the PWM signal PWM is adjusted according to the current detection signal Ss and the comparison of the power supply threshold.

The other operation manner is that, when the AC/DC conversion circuit 102 operates in the maximum output power, the corresponding parameter (namely the maximum output parameter) are previously set in the control unit 30 so that the control unit 30 can directly control the DC/DC conversion circuit 104 according to the maximum output parameter when the control unit 30 wants to control the lifting of the platform 200A. In particular, the parameters, that is, the maximum output parameter (when the AC/DC conversion circuit 102 operates in the maximum output power) may be usually acquired from the specifications of the AC/DC conversion circuit 102. Afterward, the control unit 30 compares the feedback generated by the DC voltage Vdc or the DC power Pdc with the power supply threshold to correspondingly adjust the duty cycle of the PWM signal PWM.

In particular, the speed adjustment of the motor 100 may have a variety of humanized designs. Specifically, since the too-fast or too-slow lifting speed of the platform 200A will cause inconvenience to the user in use, and even the possibility of accidents, the control unit 30 can set the platform 200A to have a step-by-step or speed-limiting function to slow down the adjustment speed of the platform 200A and prevent the platform 200A from lifting too fast.

Figure 3A:
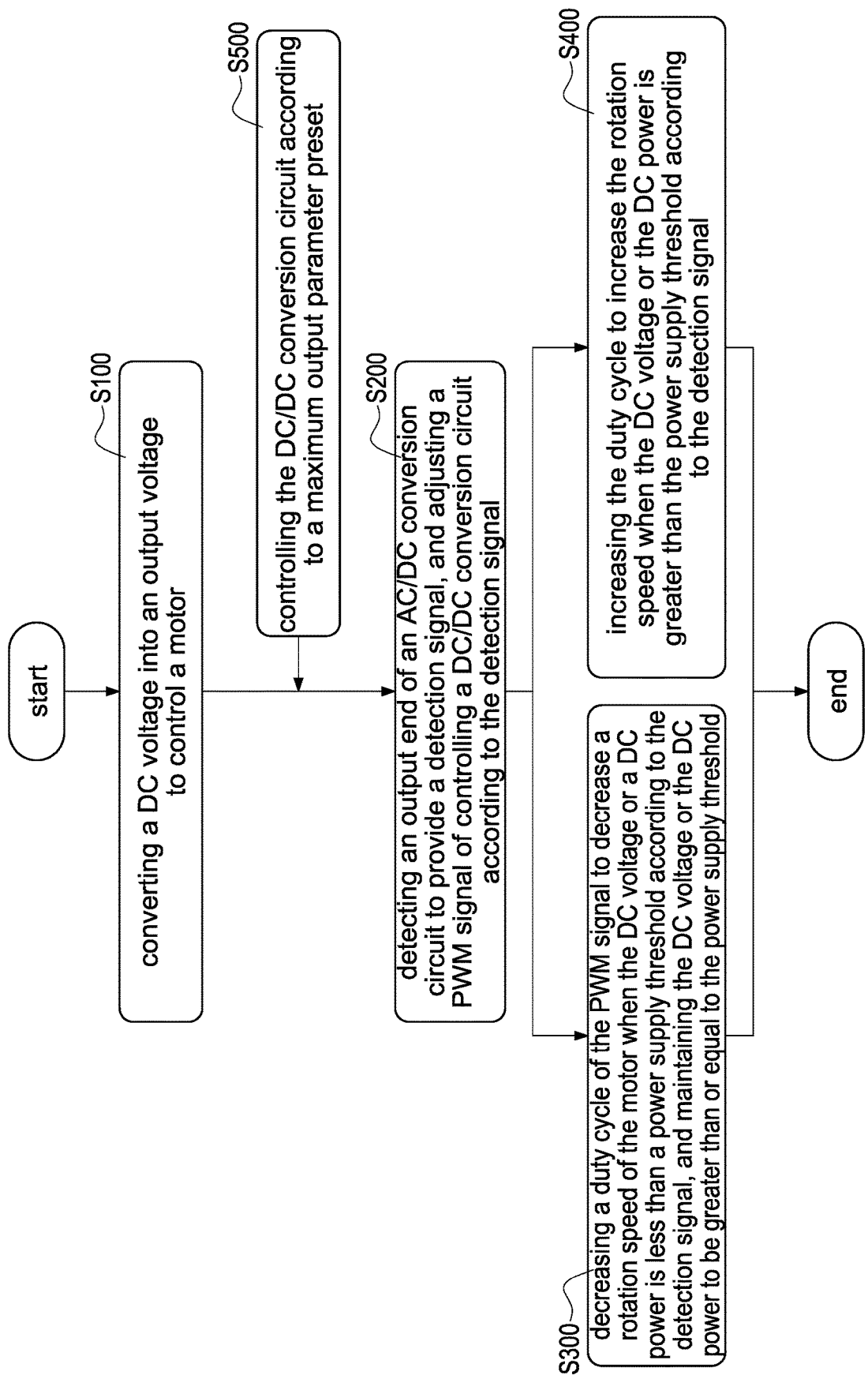
FIG. 3A is a flowchart of a method of controlling the lifting platform according to the present disclosure.

Please refer to FIG. 3A, which shows a flowchart of a method of controlling the lifting platform according to the present disclosure, and also refer to FIG. 1 to FIG. 2. The control method is applied to control the motor 100 to adjust the height of the platform 200A. The platform 200A may be a desk body (for example but not limited to an office desk, a tea table, etc., which are not used to carry heavy machine tools or large construction materials). The control method includes steps of: setting a power supply threshold, and controlling a DC/DC conversion circuit to convert a DC voltage provided by an AC/DC conversion circuit into an output voltage to control a motor (S100). In one embodiment, the control unit 30 sets the power supply threshold and provides the PWM signal PWM to control the switching of a power switch so that the DC/DC conversion circuit 104 converts the DC voltage Vdc into the output voltage Vout by switching the power switch.

Afterward, detecting an output end of the AC/DC conversion circuit to provide a detection signal, and adjusting a PWM signal of controlling the DC/DC conversion circuit according to the detection signal (S200). During the operation of the conversion circuit 10, the control unit 30 adjusts the duty cycle of the PWM signal PWM to adjust the output voltage Vout according to the detection signal Ss of the output end of the detection AC/DC conversion circuit 102 at any time, thereby adjusting the rotation speed of the motor 100.

Afterward, decreasing a duty cycle of the PWM signal to decrease a rotation speed of the motor when the DC voltage or the DC power is less than the power supply threshold according to the detection signal, and maintaining the DC voltage or the DC power to be greater than or equal to the power supply threshold (S300). When the control unit 30 realizes that the DC voltage Vdc or the DC power Pdc is less than the power supply threshold according to the detection signal Ss, the control unit 30 decreases the duty cycle of the PWM signal PWM to decrease the rotation speed of the motor 100, and maintains the DC voltage Vdc or the DC power Pdc to be greater than or equal to the power supply threshold. Therefore, it can solve the phenomenon that the platform 200A cannot rise due to the low DC voltage Vdc or DC power Pdc when the load of the platform 200A is under the heavy load condition. Afterward, increasing the duty cycle to increase the rotation speed when the DC voltage or the DC power is greater than the power supply threshold according to the detection signal (S400). When the control unit 30 realizes that the DC voltage Vdc or the DC power Pdc is greater than or equal to the power supply threshold according to the detection signal Ss, the control unit 30 increases the duty cycle of the PWM signal PWM to increase the rotation speed of the motor 100, thereby increasing the adjustment speed of lifting the platform 200A.

When the control unit 30 wants to adjust the height of the platform 200A, the control unit 30 may control the DC/DC conversion circuit according to the preset maximum output parameter (S500). The operation manner of the maximum output parameter may be implemented: the control unit 30 performs pre-loading (gradually increasing the output current Io by internal memory or manual operation) to acquire the corresponding changes in the DC voltage Vdc and the DC current Idc. Afterward, the maximum output power is calculated during the process of its change, that is, parameters corresponding to the DC power Pdc that starts to decrease is memorized (stored). Therefore, in the actual operation of lifting the platform 200A, the DC/DC conversion circuit 104 is directly controlled according to the memorized maximum output parameter, and the duty cycle of the PWM signal PWM is adjusted according to the current detection signal Ss and the comparison of the power supply threshold.

Alternatively, when the AC/DC conversion circuit 102 operates in the maximum output power, the corresponding parameter (namely the maximum output parameter) are previously set in the control unit 30 so that the control unit 30 can directly control the DC/DC conversion circuit 104 according to the maximum output parameter when the control unit 30 wants to control the lifting of the platform 200A. In particular, the parameters, that is, the maximum output parameter (when the AC/DC conversion circuit 102 operates in the maximum output power) may be usually acquired from the specifications of the AC/DC conversion circuit 102. Afterward, the control unit 30 compares the feedback generated by the DC voltage Vdc or the DC power Pdc with the power supply threshold to correspondingly adjust the duty cycle of the PWM signal PWM.

In particular, the speed adjustment of the motor 100 may have a variety of humanized designs, and therefore the step (S500) is an optional step. Specifically, since the too-fast or too-slow lifting speed of the platform 200A will cause inconvenience to the user in use, and even the possibility of accidents, the control unit 30 can set the platform 200A to have a step-by-step or speed-limiting function to slow down the adjustment speed of the platform 200A and prevent the platform 200A from lifting too fast.

Figure 3B:
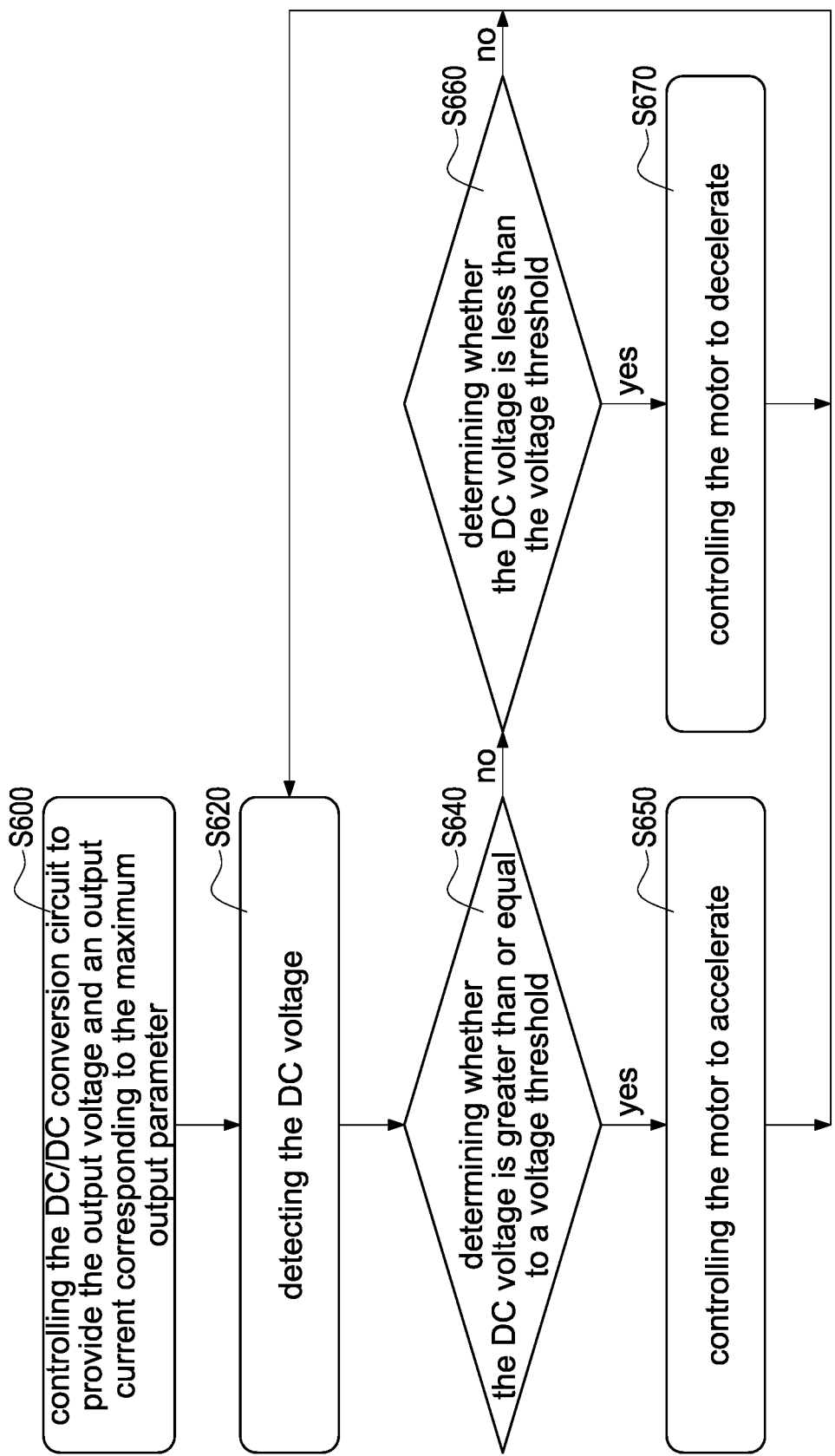
FIG. 3B is a flowchart of the method when a power supply threshold is a voltage threshold according to the present disclosure.

Please refer to FIG. 3B, which shows a flowchart of the control method when a power supply threshold is a voltage threshold according to the present disclosure, and also refer to FIG. 1 to FIG. 3A. When the power supply threshold is the voltage threshold, and the control unit 30 wants to control the motor 100 to adjust the height of the platform 200A, controlling the DC/DC conversion circuit to provide the output voltage and the output current corresponding to the maximum output parameter (S600). Afterward, detecting the DC voltage (S620). The control unit 30 receives the detection signal Ss representing the magnitude of the DC voltage Vdc to realize the magnitude of the DC voltage Vdc. Afterward, determining whether the DC voltage is greater than or equal to the voltage threshold (S640). When the DC voltage Vdc is greater than or equal to the voltage threshold, controlling the motor to accelerate (S650). The control unit 30 increases the duty cycle of the PWM signal PWM to control the DC/DC conversion circuit 104 to increase the output current Io to control the motor 100 accelerating. When the DC voltage Vdc is not greater than or equal to the voltage threshold, determining whether the DC voltage is less than the voltage threshold (S660). When the DC voltage Vdc is less than the voltage threshold, controlling the motor to decelerate (S670). The control unit 30 decreases the duty cycle of the PWM signal PWM to control the DC/DC conversion circuit 104 to decrease the output current Io to control the motor 100 to decelerating. Finally, returning to step (S620) when the determination result in step (S660) is "NO".

Figure 3C:
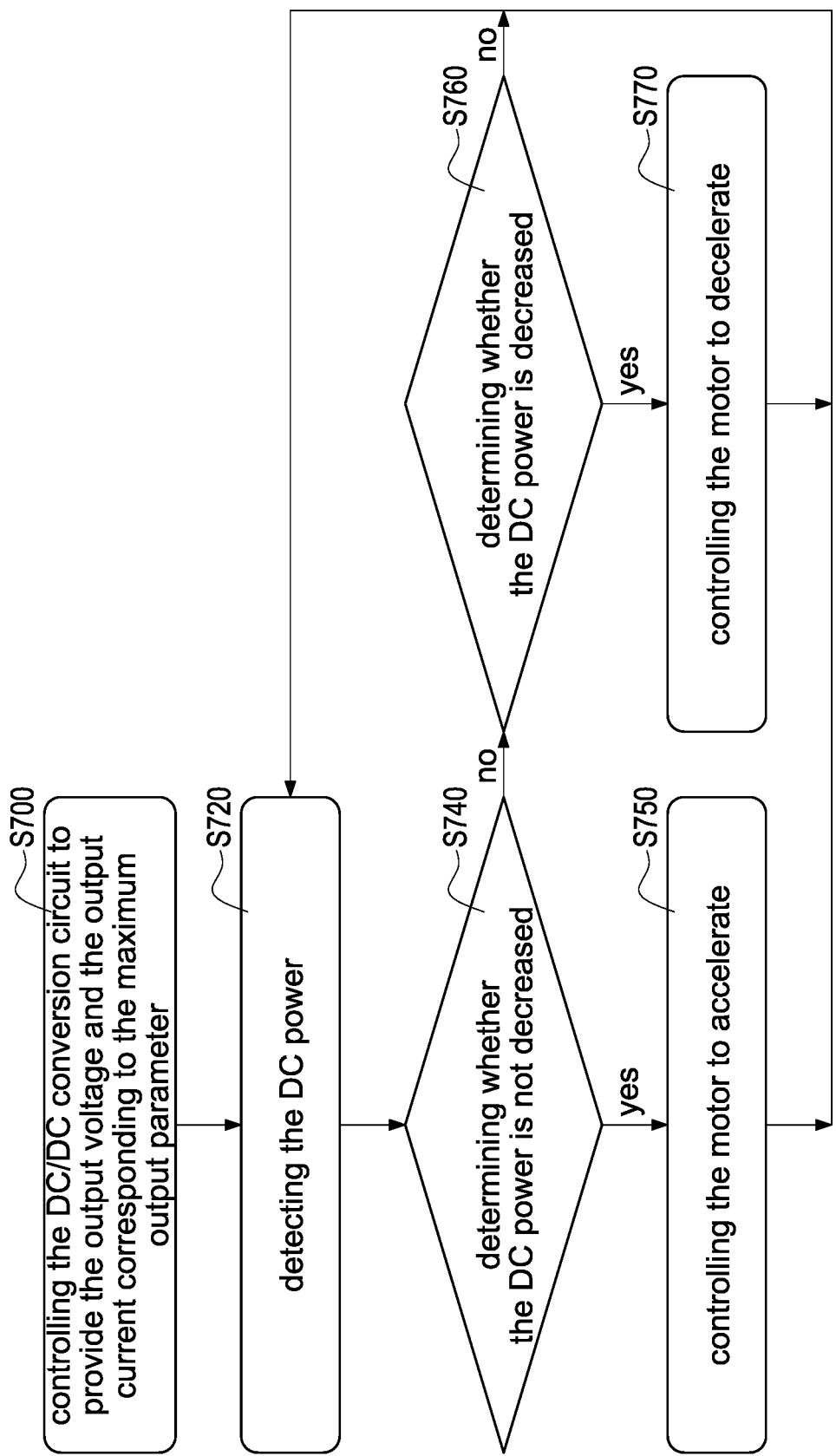
FIG. 3C is a flowchart of the method when the power supply threshold is a power threshold according to the present disclosure.

Please refer to FIG. 3C, which shows a flowchart of the control method when a power supply threshold is a power threshold, and also refer to FIG. 1 to FIG. 3A. When the power supply threshold is the power threshold, and the control unit 30 wants to control the motor 100 to adjust the height of the platform 200A, controlling the DC/DC conversion circuit to provide the output voltage and the output current corresponding to the maximum output parameter (S700). Afterward, detecting the DC power (S720). The control unit 30 calculates the DC power Pdc according to the DC voltage Vdc and the DC current Idc, and continuously tracks the increase and decrease of the DC power Pdc. Afterward, determining whether the DC power is not decreased (S740). When the DC power Pdc is not decreased, controlling the motor to accelerate (S750). The control unit 30 increases the duty cycle of the PWM signal PWM to increase the output current Io of the DC/DC conversion circuit 104, thereby increasing the rotation speed of the motor 100. When the DC power Pdc is decreased, determining whether the DC power is decreased (S760). When the DC power Pdc is decreased, controlling the motor decelerate (S770). The control unit 30 decreases the duty cycle of the PWM signal PWM to decrease the output current Io of the DC/DC conversion circuit 104, thereby decreasing the rotation speed of the motor 100. Finally, returning to step (S720) when the determination result in step (S760) is "NO".

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A control circuit applied to a lifting platform configured to control a motor to adjust a height of a platform, the control circuit comprising:
    a conversion circuit, configured to receive an input voltage and provide an output voltage to control the motor, the conversion circuit comprising:
    an AC/DC conversion circuit, configured to convert the input voltage into a DC voltage, and
    a DC/DC conversion circuit, configured to convert the DC voltage into the output voltage,
    a detection unit, configured to detect an output end of the AC/DC conversion circuit and provide a detection signal, and
    a control unit, configured to provide a PWM signal according to the detection signal to control the DC/DC conversion circuit so that the DC/DC conversion circuit converts the DC voltage into the output voltage,
    wherein the control unit sets a power supply threshold; when the control unit realizes that the DC voltage or a DC power provided by the AC/DC conversion circuit is less than the power supply threshold according to the detection signal, the control unit decreases a duty cycle of the PWM signal to decrease a rotation speed of the motor, and maintains the DC voltage or the DC power is greater than or equal to the power supply threshold, and
    wherein the power supply threshold is a power threshold, and the AC/DC conversion circuit provides a DC current to the DC/DC conversion circuit; the detection unit detects the DC voltage and the DC current and provides the detection signal to the control unit; the control unit calculates the DC power according to the detection signal, and sets the maximum output power to be the power threshold when the DC power at a maximum output power, and decreases the duty cycle when the DC power is less than or equal to the maximum output power.

2. The control circuit as claimed in claim 1, wherein the control unit sets the DC/DC conversion circuit according to a maximum output parameter so that the DC/DC conversion circuit provides the output voltage corresponding to the maximum output parameter and an output current to the motor.

3. The control circuit as claimed in claim 1, wherein when the control unit realizes that the DC voltage or the DC power is greater than the power supply threshold, the control unit increases the duty cycle to increase the rotation speed.

4. The control circuit as claimed in claim 1, wherein the lifting platform is a lifting table, and the motor is a DC motor.

5. A control circuit applied to a lifting platform configured to control a motor to adjust a height of a platform, the control circuit comprising:
    a conversion circuit, configured to receive an input voltage and provide an output voltage to control the motor, the conversion circuit comprising:
    an AC/DC conversion circuit, configured to convert the input voltage into a DC voltage, and
    a DC/DC conversion circuit, configured to convert the DC voltage into the output voltage,
    a detection unit, configured to detect an output end of the AC/DC conversion circuit and provide a detection signal, and
    a control unit, configured to provide a PWM signal according to the detection signal to control the DC/DC conversion circuit so that the DC/DC conversion circuit converts the DC voltage into the output voltage,
    wherein the control unit sets a power supply threshold; when the control unit realizes that the DC voltage or a DC power provided by the AC/DC conversion circuit is less than the power simply threshold according to the detection signal, the control unit decreases a duty cycle of the PWM signal to decrease a rotation speed of the motor, and maintains the DC voltage or the DC power is greater than or equal to the power supply threshold, and
    wherein the power supply threshold is a voltage threshold; the detection unit detects the DC voltage and provides the detection signal to the control unit; the control unit compares the detection signal with the voltage threshold and decreases the duty cycle when the DC voltage corresponding to the detection signal is less than or equal to the voltage threshold.

6. The control circuit as claimed in claim 5, wherein a power load curve is formed by the DC voltage and a DC current provided by the AC/DC conversion circuit, and the control unit sets the DC voltage corresponding to a maximum output power of the power load curve is set to the voltage threshold.

7. The control circuit as claimed in claim 5, wherein the control unit sets the DC/DC conversion circuit according to a maximum output parameter so that the DC/DC conversion circuit provides the output voltage corresponding to the maximum output parameter and an output current to the motor.

8. The control circuit as claimed in claim 5, wherein when the control unit realizes that the DC voltage or the DC power is greater than the power supply threshold, the control unit increases the duty cycle to increase the rotation speed.

9. The control circuit as claimed in claim 5, wherein the lifting platform is a lifting table, and the motor is a DC motor.

10. A method of controlling a lifting platform, comprising steps of:
    setting a power supply threshold, and controlling a DC/DC conversion circuit to convert a DC voltage provided by an AC/DC conversion circuit into an output voltage to control a motor,
    detecting an output end of the AC/DC conversion circuit to provide a detection signal, and adjusting a PWM signal of controlling the DC/DC conversion circuit according to the detection signal, and decreasing a duty cycle of the PWM signal to decrease a rotation speed of the motor when the DC voltage or a DC power provided by the AC/DC conversion circuit is less than the power supply threshold according to the detection signal, and maintaining the DC voltage or the DC power to be greater than or equal to the power supply threshold, and wherein the power supply threshold is a power threshold, and the AC/DC conversion circuit provides a DC current to the DC/DC conversion circuit, the control method further comprises steps of:

detecting the DC voltage and the DC current to provide the detection signal, calculating the DC power according to the detection signal, and setting a maximum output power as the power supply threshold when tracking the DC power at the maximum output power, and decreasing the duty cycle when the DC power is less than or equal to the maximum output power.

11. The method as claimed in claim 10, wherein the control method further comprises a step of:

setting the DC/DC conversion circuit according to a maximum output parameter so that the DC/DC conversion circuit provides the output voltage corresponding to the maximum output parameter and an output current to the motor.

12. The method as claimed in claim 10, whether the control method further comprises a step of:

increasing the duty cycle to increase the rotation speed when the DC voltage or the DC power is greater than the power supply threshold according to the detection signal.

13. A method of controlling a lifting platform, comprising steps of:

setting a power supply threshold, and controlling a DC/DC conversion circuit to convert a DC voltage provided by an AC/DC conversion circuit into an output voltage to control a motor, detecting an output end of the AC/DC conversion circuit to provide a detection signal, and adjusting a PWM signal of controlling the DC/DC conversion circuit according to the detection signal, and decreasing a duty cycle of the PWM signal to decrease a rotation speed of the motor when the DC voltage or a DC power provided by the AC/DC conversion circuit is less than the power supply threshold according to the detection signal, and maintaining the DC voltage or the DC power to be greater than or equal to the power supply threshold, and wherein the power supply threshold is a voltage threshold, and the control method further comprises steps of:

detecting the DC voltage to provide the detection signal, and realizing the DC voltage according to the detection signal, and comparing the DC voltage with the voltage threshold to decrease the duty cycle when the DC voltage is less than or equal to the voltage threshold, wherein a power load curve is formed by the DC voltage and a DC current provided by the AC/DC conversion circuit, and the DC voltage corresponding to a maximum output power of the power load curve is set to the voltage threshold.

14. The method as claimed in claim 13, wherein the control method further comprises a step of:

setting the DC/DC conversion circuit according to a maximum output parameter so that the DC/DC conversion circuit provides the output voltage corresponding to the maximum output parameter and an output current to the motor.

15. The method as claimed in claim 13, whether the control method further comprises a step of:

increasing the duty cycle to increase the rotation speed when the DC voltage or the DC power is greater than the power supply threshold according to the detection signal.

* * * * *